United States Patent
Alzaydi

(10) Patent No.: US 11,619,354 B2
(45) Date of Patent: Apr. 4, 2023

(54) MULTI-WALLED FLUID STORAGE TANK

(71) Applicant: King Fahd University of Petroleum and Minerals, Dhahran (SA)

(72) Inventor: Ammar Alzaydi, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 626 days.

(21) Appl. No.: 16/028,621

(22) Filed: Jul. 6, 2018

(65) Prior Publication Data
US 2020/0011483 A1 Jan. 9, 2020

(51) Int. Cl.
*F17C 13/04* (2006.01)
*F17C 1/00* (2006.01)

(52) U.S. Cl.
CPC .............. *F17C 13/04* (2013.01); *F17C 1/00* (2013.01); *F17C 2201/0109* (2013.01); *F17C 2201/0128* (2013.01); *F17C 2203/0631* (2013.01); *F17C 2205/0149* (2013.01); *F17C 2205/0332* (2013.01); *F17C 2209/232* (2013.01); *F17C 2270/01* (2013.01)

(58) Field of Classification Search
CPC .... F17C 1/00; F17C 13/04; F17C 2201/0109; F17C 2201/0128; F17C 2203/0631; F17C 2203/0629; F17C 2203/0626; F17C 2205/0149; F17C 2205/0134; F17C 2201/0166; F17C 2205/0332; F17C 2260/011

USPC .......................................................... 220/585
See application file for complete search history.

(56) References Cited

U.S. PATENT DOCUMENTS

| 339,885 A * | 4/1886 | Hill .................... F16L 59/12 |
| | | 138/148 |
| 5,623,832 A | 4/1997 | Bokitch et al. |
| 9,383,065 B1 | 7/2016 | Cady et al. |

FOREIGN PATENT DOCUMENTS

| CN | 103174932 B | 8/2015 |
| ES | 2428942 B1 | 9/2014 |
| JP | 2004-293784 A | 10/2004 |

* cited by examiner

*Primary Examiner* — John K Fristoe, Jr.
*Assistant Examiner* — Jennifer Castriotta
(74) *Attorney, Agent, or Firm* — Oblon, McClelland, Maier & Neustadt, L.L.P.

(57) ABSTRACT

A multi-walled storage tanks use pressure differences between walls/shells to maximize fluid mass storage for tank size by reducing or minimizing the distance between the outer most layers of a multi-layer storage device, and keeping the middle one(s), particularly the innermost space, as large as possible, while having shell walls of substantially the same material and thickness, with no wall being thicker than the inner shell wall.

9 Claims, 7 Drawing Sheets

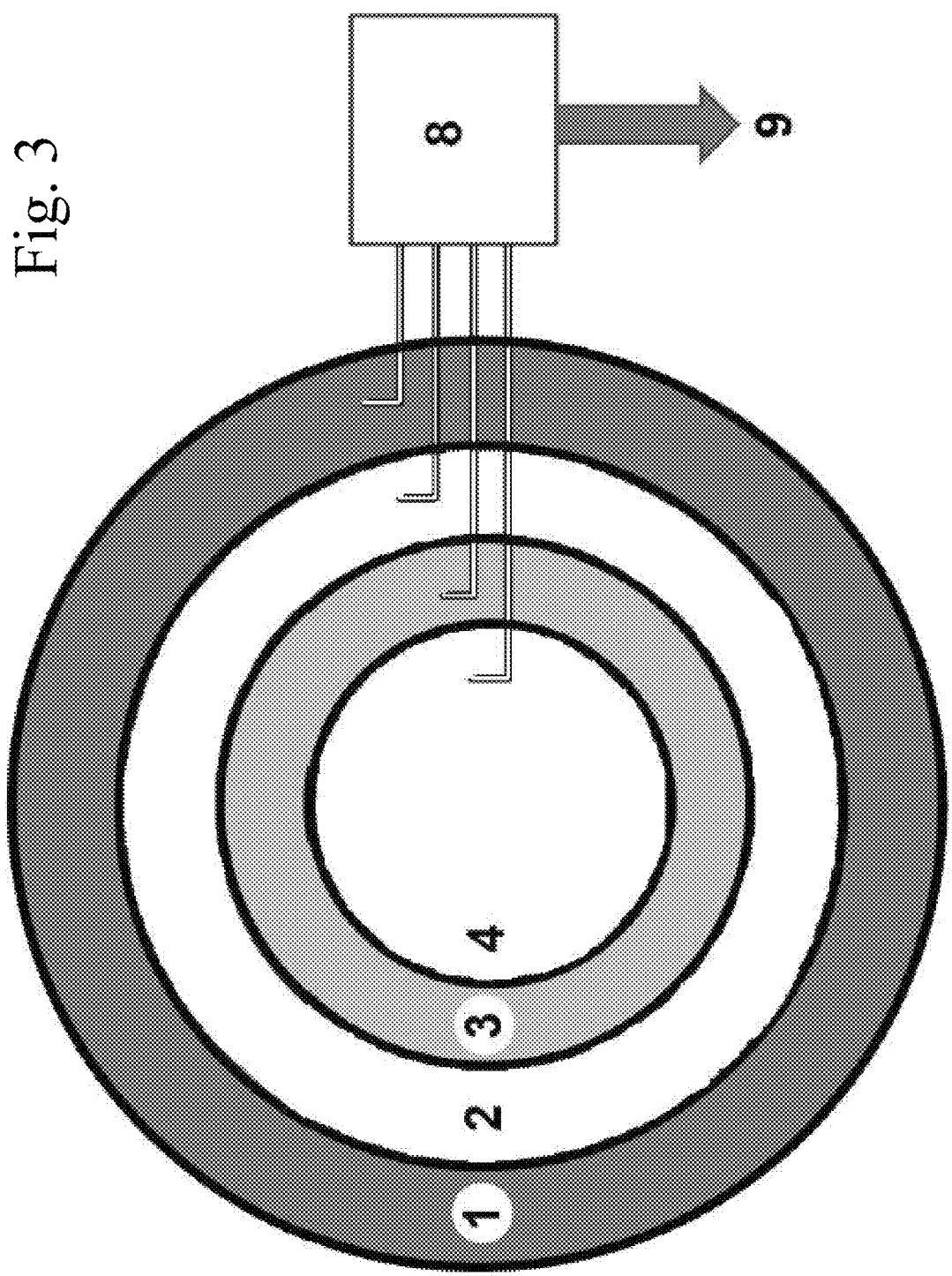

MULTI-WALLED FLUID STORAGE TANK

BACKGROUND OF THE INVENTION

Field of the Invention

This application relates to fluid storage devices and methods, particular tanks for containing gaseous fluids, and increasing volume efficiency of these devices.

Description of the Related Art

Increasing pressure in fluid storage devices, e.g., tanks and pressure vessels, has typically meant increasing the wall/shell thickness of the tank and/or using expensive high density materials, thereby significantly increasing the weight of the tank shell and/or construction costs. Adding more gas and/or liquid volume in a tank under limited pressure, due to wall/shell strength limitations, has typically meant increasing the size of the tank itself, thereby providing additional gaseous and/or liquid volume. Therefore, storing, including compressing, more gas and/or liquid in a tank has traditionally meant increasing the tank size and/or increasing tank wall thickness and/or using stronger materials, thereby making the tank unusable in certain applications, e.g., due to size and/or weight restrictions, such as compact automotive or aerospace applications.

JP 2004-293784 A seeks to provide a lightweight pressure vessel with a peripheral wall part of a vessel body of the pressure vessel having a multi-layer structure, formed of a plurality of peripheral wall structural walls, arranged with an interval in a direction from inside to outside of the vessel body. Its vessel body has a plurality of filling chambers formed inside the structural wall on the innermost side of its structural walls, and a space formed between its adjacent structural walls. An end plate, having a greater thickness than the structural walls, is arranged in an end of its vessel body. Its plurality of structural walls are air-tightly bonded to the end plate. Gas inlet/outlet tubes are separately connected to each of its filling chambers through inlet/outlet passages in the end plate.

However, JP 2004-293784 A makes no mention of a layering design to store more material for a fixed tank volume, instead describing controlling pressure by reading a pressure difference between layers and saving weight by reducing layer thickness. By reducing the inner structural wall thicknesses JP 2004-293784 A diminishes its tanks' suitability for higher pressure differences because thinner inside layers reduce tolerable pressure differences, providing a tank with relatively thin inner layers and all layers requiring very close pressures in order to avoid bursting. In addition, JP 2004-293784 A teaches uniform spacing between its structural walls, and thinner structural walls than its end plate as well as inwardly diminishing structural wall thickness.

CN 103174932 B discloses a cryogenic storage tank with an outer cylinder, a middle cylinder, and an inner cylinder; wherein the outer cylinder is disposed outside a left end of its left seal, with a right outer seal disposed to the right; either end of its intermediate portion of the outer cylinder has an evacuator; an outer wall of its inner cylinder has an aluminum foil layer with a plurality of fixing portions at the outer aluminum foil layer; a first cavity formed between the middle cylinder and the inner wall of the inner cylinder, the inner cylinder is fixed to the inner wall of the barrel via fixing portions; a vacuum in communication, through a first conduit, to the first cavity; a first control valve disposed on the first conduit; a first insulating layer disposed outside the plurality of support portion, in the outer wall of the tank; a second cavity, containing perlite filler, formed between the outer cylinder and middle cylinder; support portions fixing the inner wall of the outer cylinder to the middle cylinder; and a second insulating layer on an inner wall of the outer cylinder.

However, aside from requiring complicated insulation layers, aluminum layers, and the like, CN 103174932 B does not suggest altering the spacing of the shells with respect to each other, nor pressures between its shells, to maximize contained mass nor teaches anything on the wall thicknesses of its respective cylinders.

U.S. Pat. No. 9,383,065 discloses a tank for storing fluid in an underwater cryogenic storage vessel designed for use in a fuel system of an underwater vehicle, the storage vessel including at least two concentrically arranged storage tanks. Its first storage tank surrounds the second storage tank, so as to protect the second storage tank from external environmental conditions. Its storage vessel also includes a storage compartment positioned adjacent to the two storage tanks. Its storage vessel may be an underwater cryogenic storage vessel storing liquid $O_2$ used as a fuel cell reactant and liquid $CO_2$, as an effluent of the fuel cell.

However, U.S. Pat. No. 9,383,065's outer shell is a protective feature, its device includes a complex number of fluid entry and exit ports, its tanks seem to have a common base, and its compartments are not arranged to maximize fluid contents. Moreover, U.S. Pat. No. 9,383,065 teaches roughly equally spaced tank walls and a supplemental storage compartment below the common base wall of its upper multi-wall structure.

ES 2 428 942 B1 discloses a steam generator, particularly used in system for reforming of hydrocarbons/alcohols, preferably ethanol, for subsequent feeding as a stack fuel in marine applications. Its steam generator conditions the water reagent in the system for reforming the hydrocarbons/alcohols, by generating a stream of water vapor saturated by providing a post-combustion gas stream with a high content of water vapor from a combustion stage system reforming. ES 2 428 942 B1 discloses a set of concentric cylindrical walls in its cylindrical steam generator, the concentric cylindrical walls having a common base and top surface. However, ES 2 428 942 B1 teaches roughly equally spaced walls without any suggestion of gaseous mass maximization, and complicated, baffle-comprising tubes as well as a decanter and further steam reformer.

U.S. Pat. No. 5,623,832 discloses extraction of a "fluent" material from a pressurized system containing such material, e.g., CFC for reclamation, effected into a container by reducing the temperature of the container to a sufficiently cold temperature to generate a vacuum within the container sufficient to extract the CFC from the system to be extracted. Its container is cooled by placement into an insulated drum containing a glycol bath having an evaporator duct with a plurality of separate duct portions lying in horizontal planes and spaced vertically with each portion interconnected to the next by a vertical section of the duct. $CO_2$ is injected into its duct from a compressed liquid supply passing through a metering orifice tuned to the length and shape of the duct so that evaporation takes place by the end of the duct.

However, U.S. Pat. No. 5,623,832's arrangement consists of an outer drum, constituting an outer wall, and an outer container, constituting an inner wall, which drum and outer container surround an insulation material and contain an additional container, resting upon the inner wall. Its additional container has its own upper surface, independent of the surrounding shells, and the drum and outer container join at a common annular upper surface, which is bridged by a further annular upper surface spanning from the upper outer perimeter of the inner container to the common annular upper surface, forming a sort of common upper surface. U.S. Pat. No. 5,623,832 does not teach a maximized inner tank size.

Aspects of the invention may address one or more of the shortcomings of the art.

SUMMARY OF THE INVENTION

The present invention can address one or more deficiencies of the art, using pressure differences between walls/shells of a multi-wall storage container to store more mass in fluid, i.e., gas and/or liquid, compared to known tanks of the same size. Mass capacity maximization can be achieved by reducing or minimizing the distance between the outer most layers of a multi-layer storage device, and keeping the inner one(s), particularly the innermost space, as large as possible, which may allow maximizing the mass of fluid held in the storage device to 2, 3, or even 4 times (assuming 4 to 5 shells/layers) that of comparable outer overall volume tanks, i.e., tanks of the same outermost wall/shell size or tanks of the same outwardly apparent volume, disregarding interior shells and/or surface area.

Inventive storage devices may provide greater fluid storage capacity by compressing more gas/fluid using higher pressures in equivalent or smaller tank sizes without the need for thicker, stronger, heavier, and/or more expensive tank shells. This may be achieved by a multi-wall, i.e., multi-shell, design with gas and/or liquid pressure-controlled spacings between the shells. Such devices may include one or more pressure control systems to systematically, and safely, fill and empty the storage device. Thus, pressure increases in such storage devices/tanks can be managed—e.g., fourfold what the outer shell, or one inner shell, typically could support—without adding extra shell weight to the storage device/tank by increasing shell thickness and/or without using stronger shell material(s), typical conventional measures to avoid explosions.

The inventive approach, e.g., implementing a particular wall/shell layering arrangement and/or pressure control, can allow for storage of more mass of (compressed) gaseous and/or liquid material in the same effective volume tank, i.e., pressure vessel or storage device, than a traditional tank of the same size (overall tank volume). That is, the invention may allow the storage of more gas/liquid volume without increasing overall tank size. Such an approach may also reduce the cost of building a tank by using traditional materials instead of expensive high-tech layers to withstand high pressures, and/or make higher pressures possible with weaker and/or low-cost tank building material. This approach may likewise use more expensive materials more efficiently, providing even greater (mass) storage.

Aspects of the invention provide storage tanks comprising: a first vessel, including a first wall and a first internal cavity; a second vessel, including a second wall and a second internal cavity, the second vessel being secured inside the first internal cavity; and a third vessel, including a third wall and a third internal cavity, the third vessel being secured inside the second internal cavity, wherein the first vessel is configured to contain a first fluid with a first pressure of up to X, wherein the second vessel is configured to contain a second fluid with a second pressure of up to 2X, wherein the third vessel is configured to contain a third fluid with a third pressure of up to 3X, and wherein the walls of the vessels comprise substantially the same material and have substantially the same thicknesses.

Inventive tanks may further comprise: a first control valve disposed on the first vessel to regulate the first pressure inside the first internal cavity; a second control valve disposed on the second vessel to regulate a first pressure difference between the first and the second internal cavities; and a third control valve disposed on the third vessel to regulate a second pressure difference between the second and the third internal cavities.

Inventive tanks may further comprise: a fourth vessel, including a first wall and a fourth internal cavity, with the fourth vessel being secured inside the third internal cavity; and optionally, a fourth control valve disposed on the fourth vessel to regulate a third pressure difference between the third and the fourth internal cavities, wherein the fourth vessel is configured to contain a fourth fluid with a fourth pressure of up to 4X; and optionally a fifth vessel, including a fifth wall and a fifth internal cavity, the fifth vessel being secured inside the fourth internal cavity; and optionally, a fifth control valve disposed on the fourth vessel to regulate a fourth pressure difference between the fourth and the fifth internal cavities, wherein the fifth vessel is configured to contain a fifth fluid with a fifth pressure of up to 5X.

Inventive tanks may be configured such that a volume of an innermost vessel is 50% to 95% relative to the volume of the first vessel.

One or more, up to all, of the vessels in the tank may have a spherical geometry, and the vessels may be arranged concentrically. One or more, up to all, of the vessels each have a cylindrical or capsule geometry, and these vessels may be co-axially centered, i.e., having a substantially common central axis.

Inventive tanks will generally be configured to contain a single fluid, which itself may be a mixture/solution of more than one gaseous substance, but inventive tanks may alternatively be configured such that comprise one, two, three, four, or even five distinct fluids.

The walls of the vessels may have a variance of no more than 5% in thickness.

Inventive tanks may be configured such that a thickness of the innermost wall is as thick or thicker than the outermost wall, e.g., the fifth wall's thickness may be greater than or equal to the fourth wall's thickness, the fourth wall's thickness may be greater than or equal to the third wall's thickness, the third wall's thickness may be greater than or equal to the second wall's thickness, and the second wall's thickness may be greater than or equal to the first wall's thickness. Moreover, the third wall's thickness may be greater than the first wall's thickness.

The material of the walls may comprise a metal.

Inventive tanks may further comprise a pressure control unit configured to control at least one control valve on one of the vessels.

Aspects of the invention provide an article, comprising one or more inventive tank as described herein; and a substance, which is gaseous at standard temperature and pressure, as the fluids.

Aspects of the invention provide a method of increasing the mass content of a storage tank, the method comprising: filling a multi-shell tank with a gas such that a first pressure, in an outermost shell, is a value X, a second pressure, in a first inward shell is up to 2x, and an n-th pressure, in an innermost shell is up to n·X, wherein the multi-shell tank comprises the outermost shell, the first inward shell, and the innermost shell, such that the outermost shell encompasses the first inward shell, and the first inward shell encompasses the innermost shell, and wherein n is in a range of from 3 to 6. These may be methods in which each shell has the same or greater thickness relative to an adjacent outer shell in a radial direction.

Aspects of the invention provide a method of making a storage tank, the method comprising: forming a multi-shell tank comprising a first wall, a second wall, and an inner wall, such that the first wall encompasses the second wall, and the second wall encompasses the inner wall, each wall having the same or greater thickness relative to an adjacent outer wall; and adjusting the inner wall to encompass a volume of 50 to 90% of a volume encompassed by the first wall. These may be methods further comprising: filling the multi-shell tank such that the first wall contains a first pressure of up to X, the second wall contains a second pressure of up to 2X, and the inner wall contains an n-th pressure of up to n·X, wherein n is in a range of from 3 to 6.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 3 shows an elevational cross-sectional view of an exemplary storage tank having four concentric spherical shells, a pressure control system, and large spacing between shells for ease of viewing;

DETAILED DESCRIPTION OF THE PREFERRED EMBODIMENTS

Figure 1:
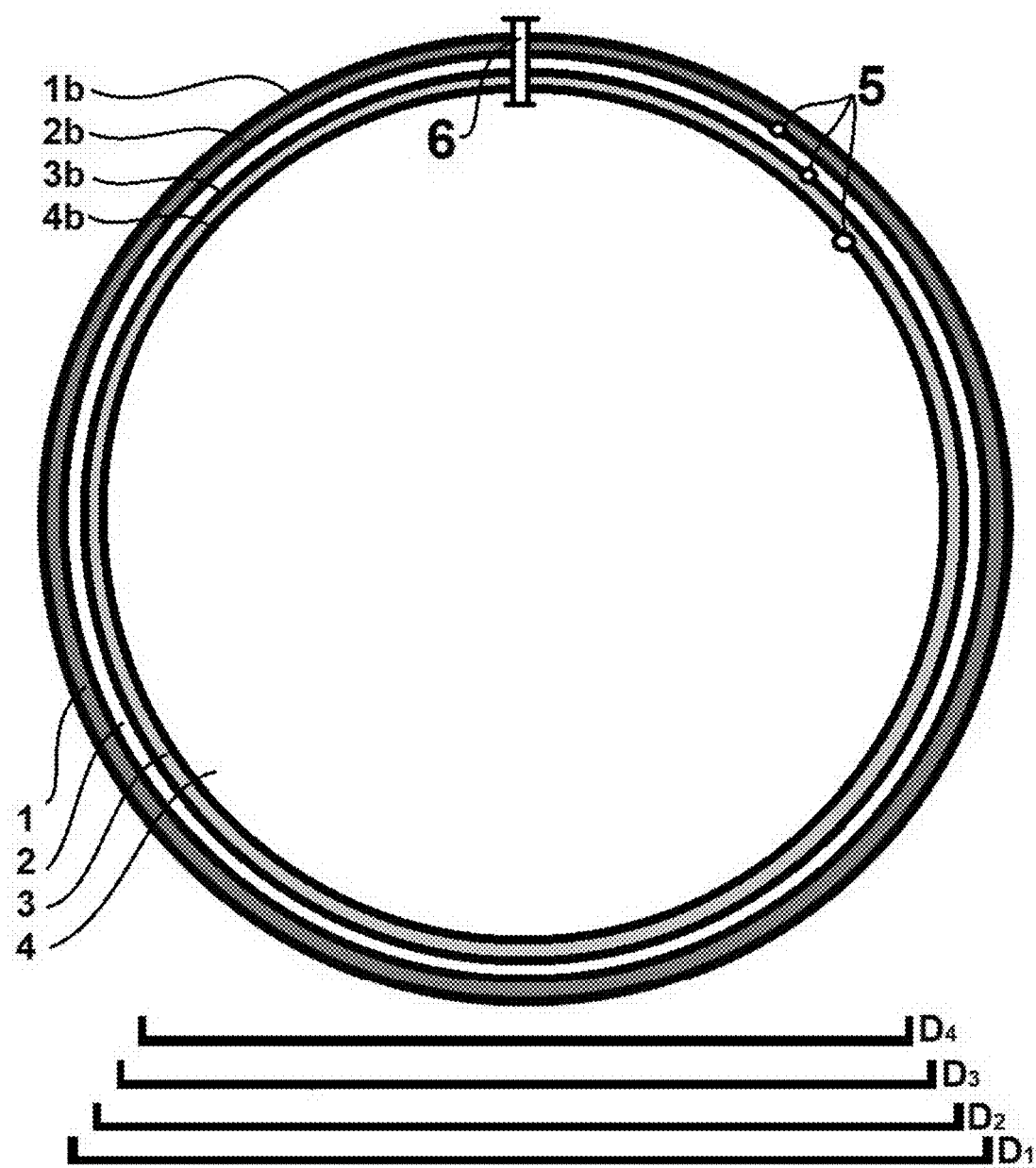
FIG. 1 shows an elevational cross-sectional view of an exemplary storage tank having four concentric spherical shells.

Storage tanks within the scope of the invention may comprise a first vessel, including a first wall and a first internal cavity; a second vessel, including a second wall and a second internal cavity, the second vessel being secured inside the first internal cavity; and a third vessel, including a third wall and a third internal cavity, the third vessel being secured inside the second internal cavity, wherein the first vessel is configured to contain a first fluid with a first pressure of up to X, wherein the second vessel is configured to contain a second fluid with a second pressure of up to 2X, wherein the third vessel is configured to contain a third fluid with a third pressure of up to 3X; and optionally, a fourth vessel, including a first wall and a fourth internal cavity, is the fourth vessel being secured inside the third internal cavity, wherein the fourth vessel is configured to contain a fourth fluid with a fourth pressure of up to 4X; and optionally a fifth vessel, including a fifth wall and a fifth internal cavity, the fifth vessel being secured inside the fourth internal cavity, wherein the fifth vessel is configured to contain a fifth fluid with a fifth pressure of up to 5X, and wherein the walls of the vessels comprise substantially the same material and have substantially the same thicknesses.

The number of shells is generally only limited by cost and machining feasibility, and will generally be in a range of from 2 to 7, 3 to 6, 3 to 5, or 4, though as few as two shells may be used to produce a mass maximizing effect. Generally, the innermost shell will be the thickest shell, though the difference in shell thicknesses—typically decreasing outwardly or constant—need not vary be any more than 10, 5, 2.5, or even 1%, while using the same or substantially the same, i.e., varying by no more than 1 wt. % content, materials for the walls.

Tanks within the scope of the invention may include one or more control/safety valves, or a system of these, to prevent unsafe pressure buildups between the shells and/or relative to the environment. Inventive tanks may further comprise: a first control valve disposed on the first vessel to regulate the first pressure inside the first internal cavity; a second control valve disposed on the second vessel to regulate a first pressure difference between the first and the second internal cavities; and a third control valve disposed on the third vessel to regulate a second pressure difference between the second and the third internal cavities; and optionally, a fourth control valve disposed on the fourth vessel to regulate a third pressure difference between the third and the fourth internal cavities; and optionally, a fifth control valve disposed on the fourth vessel to regulate a fourth pressure difference between the fourth and the fifth internal cavities.

The control valve(s) may be uni-directional, in which case two uni-directional valves should generally be used on a respective shell, though it will often be preferable to use one or more bi-directional control valves, particularly one on each shell. The control (or relief) valve(s) may ideally be configured to maintain or allow at or near (e.g., within 10, 5, 3, 2, or 1% of) a maximum pressure tolerable to the shell in question. The control valve(s) or further safety valve(s) may be configured to discharge or relocate condensate.

The maximum pressure of the wall(s) will generally depend upon the material of the wall(s), but will usually be in a range of from 0.5 to 500 MPa, 1 to 250 MPa, 10 to 150 MPa, 15 to 100 MPa, or up to 200, 175, 125, 115, 90, 85, 80, or 75 MPa. A minimum (non-vacuum) pressure of the wall(s) will likewise generally depend upon the material of the wall(s), and will usually be at least 0.2, 0.75, 1.5, 2.5, 5, 7.5, 20, 25, 40, 50, or even 70 MPa. For stationary tanks, a maximum pressure tolerance of the walls may even be 1 GPa, while for glass or thinner plastic tanks, the maximum may be 1 or 5 MPa. Of course, vacuum underpressures may also be tolerated by materials of the wall, e.g., 0.0001 Pa or even less, depending on the wall material and thickness.

Inventive tanks may be configured such that a volume of an innermost vessel is in a range of from 50% to 90% relative to the volume of the first vessel, e.g., at least 55, 60, 65, 70, 75, 80, or 85% of the first vessel (outermost of the tank). The radius of the innermost shell being as close to that of the outermost shell as technically possible and/or feasible, considering design and machining limitations, may allow the tank to contain the largest mass of fluid possible. Depending upon the number of shells, but particularly for intermediate shells, i.e., those which are neither the innermost, nor outermost shell, the volume of an inwardly adjacently shell relative to the next outer shell will generally be in a range of 70 to 99%, 80 to 98%, 85 to 97.5%, or 90 to 95%. It is generally preferable that the intermediate vessel(s)/shell(s) are as close in shape, volume, and/or diameter to the outermost vessel, in order to maximize the volume of the innermost vessel/shell.

One or more, up to all, of the vessels in the tank may have a spherical geometry, and the vessels may be arranged concentrically. One or more, up to all, of the vessels each have a cylindrical or capsule (i.e., cylindrical with one or two rounded ends) geometry, and these vessels may be co-axially centered, i.e., having a substantially common central axis. Further acceptable geometries are contemplated, such as ovular or elliptical, rectangular, hexagonal, or octagonal prismic, though spherical, cylindrical, and capsular shapes will be preferred for many applications. Symmetrical shapes are generally preferable.

Inventive tanks will generally be configured to contain a single fluid, which itself may be a mixture or solution of more than one gaseous substance, but inventive tanks may alternatively be configured to contain one, two, three, four, or even five distinct fluids. The use for one fluid may be preferable, depending upon the end use.

The walls of the vessels preferably have a variance of no more than 10% in thickness, in particular, no more than 5, 3, 2, or 1% in thickness relative to other walls. Generally, the innermost shell will have the thickest wall.

Inventive tanks may be configured such that the innermost wall is as thick or thicker than the outermost wall, e.g., the fifth wall's thickness may be greater than or equal to the fourth wall's thickness, the fourth wall's thickness may be greater than or equal to the third wall's thickness, the third wall's thickness may be greater than or equal to the second wall's thickness, and the second wall's thickness may be greater than or equal to the first wall's thickness. Moreover, the third wall's thickness may be greater than the first wall's thickness. Wall thicknesses useful in the invention will vary according to application, but may be in a range of from 1 to 250 mm, 1.5 to 150 mm, 2 to 100 mm, 2.5 to 75 mm, 3 to 50 mm, or 5 to 35 mm. The walls may be at least 0.5, 1.25, 1.75, 2.25, 2.75, 3.25, 3.5, 4, or 4.5 mm thick, and/or no more than 12, 9, 8, 7, 6, 5.5, 4.5, or 4 cm thick.

The ratio of material (vessel wall) thickness to shell radius limited only by the application and the pressure maintained inside a vessel. Exemplary ratios may be in a range of from 1 (wall thickness dimension): 1000 (radius dimension), 1:750, 1:625, 1:550, 1:500, 1:400, 1:350, 1:325, 1:300, 1:275, 1:250, 1:225, 1:200, 1:175, 1:150, 1:125, 1:100, 1:75, 1:50, 1:40, 1:30, 1:25, 1:15, or 1:10.

The material of the walls may comprise a metal, glass, plastic, and/or composite though for most pressure uses (e.g., above 20 MPa), the walls will preferably comprise metal. If a material of the wall only comprises glass or plastic, i.e., not as coatings upon metal(s), the glass should be a pressure resistant glass, such as borosilicate glass or fused quartz glass. The plastic may be a polyester, such as polyethylene terephthalate (PET) or polybutylene terephthalate (PBT), polyimide, polyamide, polyolefin, such as polyethylene (PE) or polypropylene (PP), polyether, poly(meth) acrylate, polycarbonate, or a blend of two or more of these, including copolymers of these. Plastic(s) may also be used as a coating on a metallic shell wall, e.g., against corrosion, and may further include fluorinated polymers, such as polytetrafluoroethylene (PTFE), perfluoroalkoxy alkane (PFA), fluorinated ethylene propylene (FEP), ethylene tetrafluoroethylene (ETFE), polyvinylidene fluoride (PVDF), polyvinylfluoride (PVF), ethylene chlorotrifluoroethylene (ECTFE), perfluoropropylvinylether (PPVE), perfluoromethylvinylether (PMVE), polychlorotrifluoroethylene (PCTFE), or mixture(s) of two or more of any of these. Glass may also be used as a coating on a metallic shell wall, or a combination of glass, plastic, and metal, or some combination of glass and plastic may be used, including using plastics as outer coating(s) or net(s) to reduce fracture risk and/or damage.

Metal(s) for the shell walls may include any materials typically used for pressure vessels and tanks, including steel(s), such as carbon steel typically having over 0.1 wt. % but less than 0.25 wt. % carbon (and often molybdenum, manganese, chromium, and/or nickel, in amounts of up to 10 wt. %), carbon manganese steel(s), low alloy steels (typically including up to 2 or 1.5 wt. % manganese), high alloy steels, austenitic stainless steel(s), non-ferrous materials, such as aluminum, copper, nickel, copper, or titanium, and alloys of any of these, such as high duty bolting materials, Cu—Ni, Ni—Cr, Hastelloy, Hadfield steel, Eglin steel, aluminum-steel including that having small amounts of Ni precipitated as nano-particles of brittle $B_2$ intermetallic compounds, and the like. Useful steel alloying metals, beyond Fe (and C), may include vanadium, niobium, titanium, chromium, zinc, tin, cadmium, nickel, and/or molybdenum.

Inventive tanks may further comprise a pressure control unit configured to control at least one control valve on one of the vessels. This pressure control unit may be a set of analog elements, but may preferably include a CPU-run device, such as a computer, tablet, or other personal electronic device. The CPU-run device may individually control and modify each of the control valves individually, and may be combined with pressure sensor(s), temperature sensor(s), wall defect detector(s), and/or warning system(s), and may be designed to automatically fill or empty one or more of the shells as needed.

Inventive pressure control systems as used within the invention may be configured to confine the pressure differential between two walls/shells to a range tolerable by the wall structure. This differential may preferably increase inwardly, to allow higher pressures to exist in the interior, however inventive systems may allow stepped increases and/or decreases in pressure across shells in correspondence with the strength of each wall's strength. For example, in a 5-wall system, the environmental pressure may be roughly 0 or negligible, e.g., standard pressure 0.1 MPa, and the pressure within shell 1 will be (up to) X, leaving a differential of X between the environment and/or any non-pressurized outer layer(s)—e.g., insulation, coating(s), reflector(s)—and the outermost wall. The pressure within shell 2 may be (up to) 2·X, versus the pressure (up to) X within shell 1, would again leave a differential of X between walls ½. The pressure within shell 3 may be (up to) 3·X, versus the pressure (up to) 2·X within shell 2, would again leave a differential of X between walls ⅔. The pressure within shell 4 may be (up to) 4·X, versus the pressure (up to) 3·X within shell 3, would again leave a differential of X between walls ¾. The pressure within shell 5 may be (up to) 5·X, versus the pressure (up to) 4·X within shell 4, would again leave a differential of X between walls ⅘. However, the pressure differentials may be maintained, e.g., by the pressure control unit/system, in any way such that the particular differential does not exceed the mechanical strength of the particular wall.

The pressure control system may be operated in a shell system initially at a shelled-pressure distribution of, e.g., 280 MPa:210 MPa:140 MPa:70 MPa: environment, with walls all capable of tolerating at least 70 MPa (generally at least 2.5, 5, 10, or 25% more, at least in accordance to local regulations), may be managed to (a) 140 MPa:210 MPa:140 MPa:70 MPa: environment; (b) 140 MPa:70 MPa:140 MPa:70 MPa: environment; (c) 140 MPa:70 MPa:0 MPa:70 MPa: environment; (d) 140 MPa:70 MPa: 0 MPa: 0 MPa: environment; (e) 0 MPa:0 MPa:0 MPa:0 MPa: environment; and (f) 0 MPa:0 MPa:0 MPa: 0 MPa: environment. The filling, e.g., using a pressure control system, may be conducted in essentially the opposite manner, though, of course, any sequence may be employed so long as the pressure differential does not exceed the mechanical strength of the wall in question. For an alternate example, one could fill to (a) 70 MPa:70 MPa:70 MPa:70 MPa: environment; (b) 140 MPa: 140 MPa:140 MPa:70 MPa: environment; (c) 210 MPa:210 MPa:140 MPa:70 MPa: environment; (d) 280 MPa:210 MPa:140 MPa: 70 MPa: environment. For safety considerations, the pressure control unit/system may sequentially open the control valves, or simultaneously, guided by the mechanical strength of the walls. According to the amount the wall mechanical strength exceeds the pressure differential, e.g., 1.1-fold, 1.25-fold, 1.5-fold, 2-fold, 2.5-fold, 3-fold, 3.1-fold, 3.25-fold, or the like, the pressure control unit/system may be operated such that the inner shell(s) serve as a safety system in the event of a breach and/or failure of the outer wall(s).

Aspects of the invention provide article(s) comprising one or more inventive tanks as described herein; and a substance, which is gaseous at standard temperature and pressure (STP), as the fluids. That is, inventive tanks can be distributed filled with a useful gas. Examples of such gases include nitrogen ($N_2$), oxygen ($O_2$), argon (Ar), helium (He), neon (Ne), argon (Ar), krypton (Kr), xenon (Xe), radon (Rn), hydrogen ($H_2$), chlorine ($Cl_2$), fluorine ($F_2$), ammonia ($NH_3$), carbon dioxide ($CO_2$), carbon monoxide (CO), synthesis gas, forming gas, hydrogen chloride (HCl), nitrous oxide ($N_2O$), nitrogen trifluoride ($NF_3$), sulfur dioxide ($SO_2$), sulfur hexafluoride ($SF_6$), methane ($CH_4$), natural gas, acetylene ($C_2H_2$), ethane ($C_2H_6$), ethene ($C_2H_4$), propane ($C_3H_8$), propylene ($C_3H_6$), butane ($C_4H_{10}$), butene(s) ($C_4H_8$), air, breathing gas(es), (welding) shielding gas, and/or flue gas, as well as even liquefied natural gas (LNG) or liquefied petroleum gas (LPG). Combinations of gases may also be contained in tanks within the scope of the invention, optionally separately from each other. A particularly preferred gas in certain applications may be $H_2$, though practically any industrial gas may be used in a tank according to the invention.

One or more inventive tanks may be incorporated into an article or device, such as an automobile (cars, trucks, semis, motorcycles, mopeds, ATVs, etc.), aircraft (airplanes, helicopters, motorized gliders, and the like), seacraft (ships, yachts, submarines, cutters, up to aircraft carriers, and the like), and may be used for the storage of fuel, such as $H_2$ for fuel cells and/or (gaseous) petroleum products for combustion engines. Several of the tanks, e.g., 2, 3, 4, 5, or 6 may be used in such vehicle applications, including larger tanks useful in spacecraft, armored vehicles, defense materiel, and the like. Moreover, the tanks may be useful in medicinal applications (e.g., oxygen provision), scuba applications, and even recreational applications, such as barbecues. Inventive tanks may be used to charge batteries in electrically operated devices, including vehicles.

Aspects of the invention also provide a method of increasing the mass content of a storage tank, the method comprising: filling a multi-shell tank with a gas such that a first pressure, in an outermost shell, is a value X, a second pressure, in a first inward shell is up to 2x, and an n-th pressure, in an innermost shell is up to n·X, wherein the multi-shell tank comprises the outermost shell, the first inward shell, and the innermost shell, such that the outermost shell encompasses the first inward shell, and the first inward shell encompasses the innermost shell, and wherein n is in a range of from 3 to 6. These may be methods in which each shell has the same or greater thickness relative to an adjacent outer shell in an radial direction. Moreover, the method may apply to situations with 2, 3, 4, 5 or 6 shells, particularly 3, 4, or 5.

Aspects of the invention provide a method of making a storage tank, the method comprising: forming a multi-shell tank comprising a first wall, a second wall, and an inner wall, such that the first wall encompasses the second wall, and the second wall encompasses the inner wall, each wall having the same or greater thickness relative to an adjacent outer wall; and adjusting the inner wall to encompass a volume of 50 to 90% (or at least 55, 60, 65, 70, 75, 80, or 85% of) of a volume encompassed by the first wall. These may be methods further comprising: filling the multi-shell tank such that the first wall contains a first pressure of up to X, the second wall contains a second pressure of up to 2X, and the inner wall contains an n-th pressure of up to n·X, wherein n is in a range of from 2 to 6, 3 to 6, 3 to 5, or 3, 4, or 5.

Inventive tank technology as described herein can be applied to the numerous research and industrial areas involving storage of gas/fluids, particularly where smaller volumes are helpful, i.e., particularly in limited-space applications. Such applications can be in automotive (more fuel storage in smaller space), aerospace, robotics fuel cells, and general energy storage systems. Moreover, beyond pure fluid(s), inventive tanks may contain high surface area material(s), such as zeolite(s) and/or metal-organic frameworks, i.e., materials having BET areas in a range of from 500 to 7500, 750 to 7000, 1000 and 6750, 1500 to 6500, or 2000 to 5500 $m^2/g$, to aid gas adhesion.

A particularly relevant area of application of inventive tanks and methods may be in $H_2$ storage as energy source in hydrogen powered cars, planes, or boats. General applications of inventive tanks can include any field that required the maximum amount (volume) of compressed gas/liquid in a limited space environment.

Inventive storage tanks include a plurality of nested vessels with a hollow space between adjacent vessels. The hollow spaces may be maintained by fixation elements or spacers of suitable materials, e.g., metal, to maintain the interspacing, for example, when empty, or to prevent relative displacement of the shells. The tank may also be constructed as with "swimming" shells, i.e., affixed only by an inlet/outlet. The vessels may be made of identical materials with the roughly the same wall thicknesses. The inventive tank does not require a thicker outer wall or end section, as is often the case in the art, and may exclude such thicker outer portions, though it need not exclude thicker outer elements.

The outermost vessel, which generally defines the shape of the tank, may contain at least one gas (at STP) with a pressure of up to a value defined by X, and the innermost vessel may contain a gas with a pressure of up to a value defined by n·X, i.e., "n times X," wherein "n" is the total number of the nested vessels. A preferred storage tank may be in the form of a sphere with a plurality of spherical nested vessels, or in the form of a cylinder with a plurality of cylindrical nested vessels, or in the form of a capsule with a plurality of capsule-shaped nested vessels. Each vessel is generally equipped with a control valve to regulate the pressure of the hollow spaces. Inventive storage tanks with such nested vessels, arranged and filled appropriately, may contain a larger amount, i.e., mass, of a pressurized fluid (e.g., 1.1 to 7, 1.25 to 6, 1.5 to 5, or 2 to 4 times larger) than a vessel with the same size, thickness, and material that does not have the inventive nested topology and/or filling.

Referring now to the drawings, wherein like reference numerals designate identical or corresponding parts throughout the several views, FIG. 1 exemplifies a nested multi-walled storage tank having four concentric spherical shells, including a first wall (1*b*) surrounding a first internal cavity (1), a second wall (2*b*) surrounding a second internal cavity (2), a third wall (3*b*) surrounding a third internal cavity (3), a fourth wall (4*b*) surrounding a fourth internal cavity (4). The arrangement exemplified in FIG. 1 can be considered as a first vessel (1*b*, 1), including a first wall (1*b*) and a first internal cavity (1); a second vessel (2*b*, 2), including a second wall (2*b*) and a second internal cavity (2), the second vessel (2*b*, 2) being secured inside the first internal cavity (1); and a third vessel (3*b*, 3), including a third wall (3*b*) and a third internal cavity (3), the third vessel (3*b*, 3) being secured inside the second internal cavity (2). The exemplary layout in FIG. 1 involves four distinct shell diameters ($D_1$, $D_2$, $D_3$, $D_4$), which are all substantially similar, such that the volume of the inner shell (4), which may contain the highest pressure fluid, is maximized. The relationship of $D_1$ to $D_2$ to $D_3$ to $D_4$ may be, e.g., 1:0.975:0.95:0.925. Preferably, the relationship of the diameters will leave the outer diameter, herein $D_1$, in a relationship to the innermost diameter in a range of from 1:0.79 to 1:0.99, or 1:0.82 to 1:0.98, or 1:0.85 to 1:0.975, or 1:0.875 to 1:0.96, etc., while the intervening shells are distance in the closest manner to each other and the inner and outer shells technically feasible to allow the pressures in their chambers to exert forces on the interior walls allowing the innermost shell to maximize is mass contents. Also shown in FIG. 1 are representations of an inlet/outlet valve (6) whereby fluid may enter or leave the innermost cavity and pressure control/safety valves (5) that permit fluid communication between adjacent cavities.

Figure 2A:
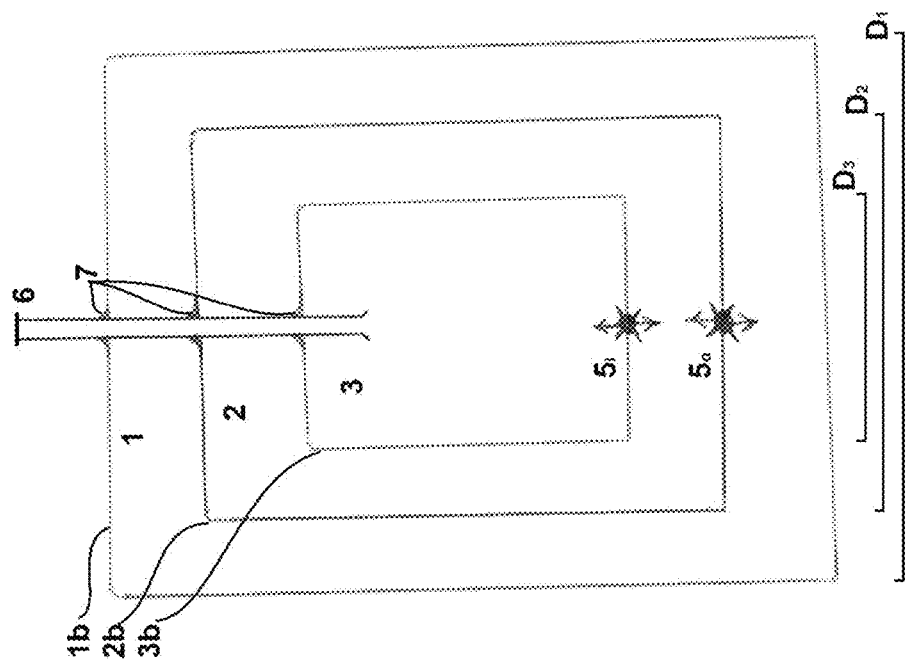
FIG. 2A shows a chart illustrating an exemplary manner of filling and emptying an exemplary inventive storage tank having three shells and large spacing between shells for ease of viewing.
Figure 2B:
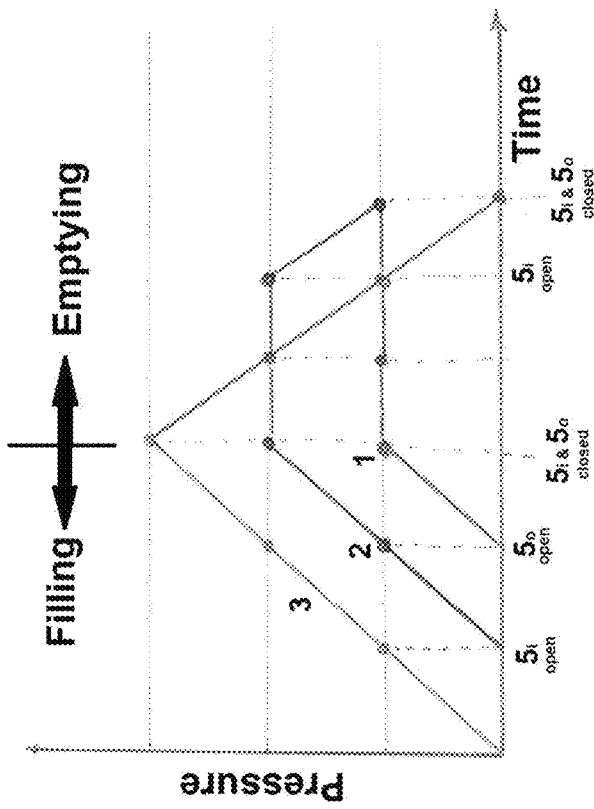
FIG. 2B shows, as an elevational cross-section, an exemplary inventive storage tank having three shells and large spacing between shells for ease of viewing, corresponding to the chart in FIG. 2A.

In reference to FIG. 2A shows a chart illustrating an exemplary manner of filling and emptying an inventive storage tank depicted in FIG. 2B comprising a first wall (1*b*) surrounding a first internal cavity (1), a second wall (2*b*) surrounding a second internal cavity (2), a third wall (3*b*) surrounding a third internal cavity (3), two bi-directional (relief) control/safety values (5$_i$ i.e., inner, 5$_o$, i.e., outer), and an inlet/outlet valve (6), which may be welded or sealed (7) to the shells within. The large spacing between shells is not necessarily desirable in maximizing mass contents, though such an arrangement is not necessarily excluded from the scope of the invention.

The chart in FIG. 2A illustrates how such a tank may be filled first into shell 3 until it approaches or reaches the wall (3*b*) strength limit, X, e.g. 80 or 100 MPa, whereupon the control valve (5$_i$) is opened, allowing in this example the middle volume to be filled and brought up to the wall's (2*b*) maximum pressure, wherein control valve (5$_o$) is opened, allowing the outer volume to be filled and brought up to the wall's (1*b*) maximum pressure. Thereafter, the inner and outer control valves are closed, and the innermost cavity is filled to a pressure 2X such that the pressure differential across the wall (3*b*) is X, although the inner shell (3) holds a pressure 2X. Thereafter, the control valve (5$_i$) is opened, allowing the middle volume (2) to be filled and brought up to the wall's (2*b*) maximum pressure differential X, although both inner shells now contain pressures of 2X. The control valve (5$_i$) is closed, allowing the inner volume to be filled and again brought up to the inner wall's (3*b*) maximum pressure differential, X, although the pressure within the inner shell (3) is now 3X. Emptying the storage tank can then be achieved by first bringing the inner shell (3) down to 2X or X, then bringing the intermediate shell (2) down to X, whereupon the inner shell (3) can be emptied entirely, since the pressure differentials would now be no greater than roughly the intended wall strength, X. By minimizing the volumes in the outer shells (here 1, 2), and maximizing the volume of the innermost shell (here, 3), a maximized mass of compressed gas may be included in the storage tank, since the highest pressure would be exercised in the largest (interior) tank. This corresponds to the ideal gas law, $pV=nRT$, holding V, R, and T constant, and increasing the pressure n-fold (the value X). This may allow a mass increase corresponding to n·X for several shells, generally in a range of from 2 to 6, though there may be a correction factor, m, which is gas/liquid dependent for non-linear fluids, making the mass content (n-m)·X.

FIG. 3 illustrates an exemplary storage tank having four concentric spherical shells including a first wall surrounding a first internal cavity (1), a second wall surrounding a second internal cavity (2), a third wall surrounding a third internal cavity (3), a fourth wall surrounding a first internal cavity (4), a pressure control system (8), and an arrow representing out-flowing gas(es) (9). There may be additional control valves (5), e.g., at least one on each internal shell, in order to transmit fluid through adjacent cavities, though this may also be achieved by the pressure control system (8). The pressure control unit/system (8) may regulate the fluid from the small cavities is regulated with respect to the exterior of the device, i.e., 1, 2, 3, and/or 4 to 9, and/or with respect to adjacent cavities, i.e., 1 to 2, 2 to 3, or 3 to 4.

Figure 4:
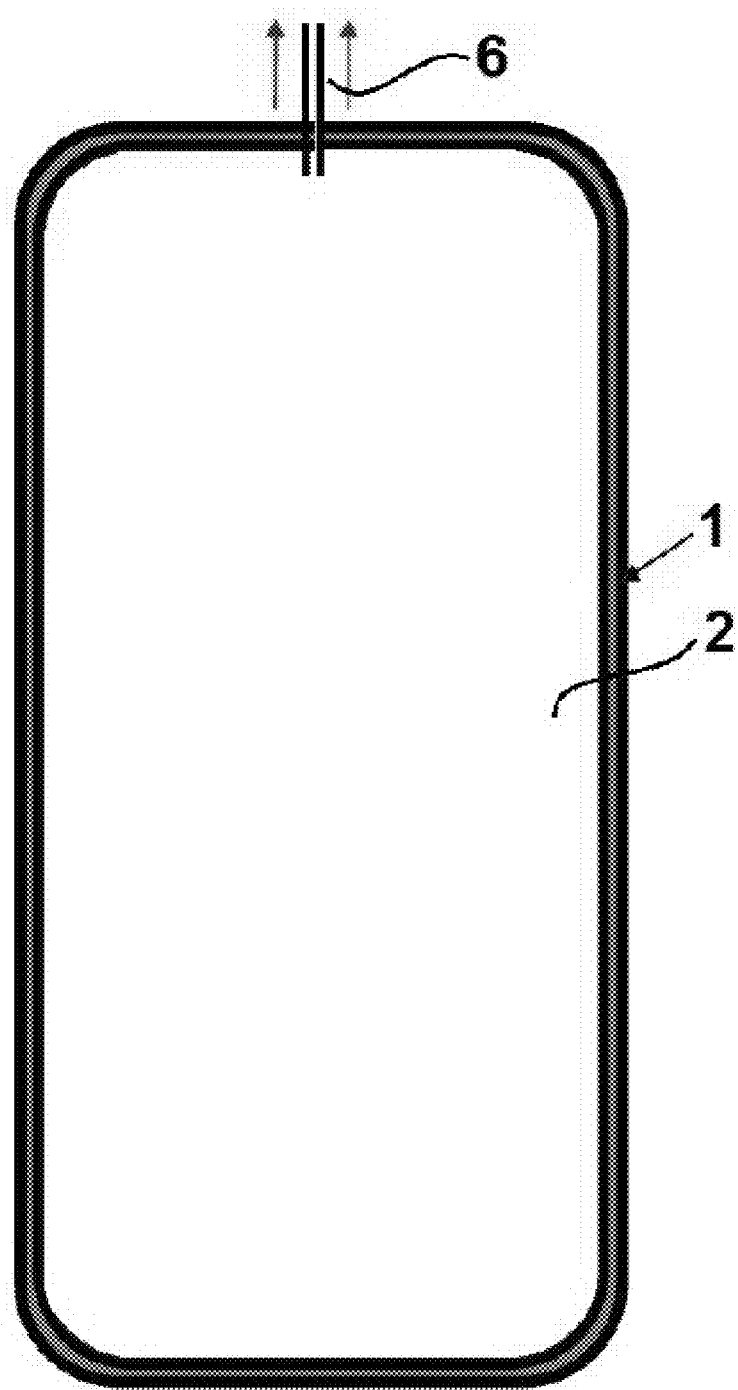
FIG. 4 shows an elevational cross-sectional view of an exemplary storage tank having two rounded cylindrical shells.
Figure 5:
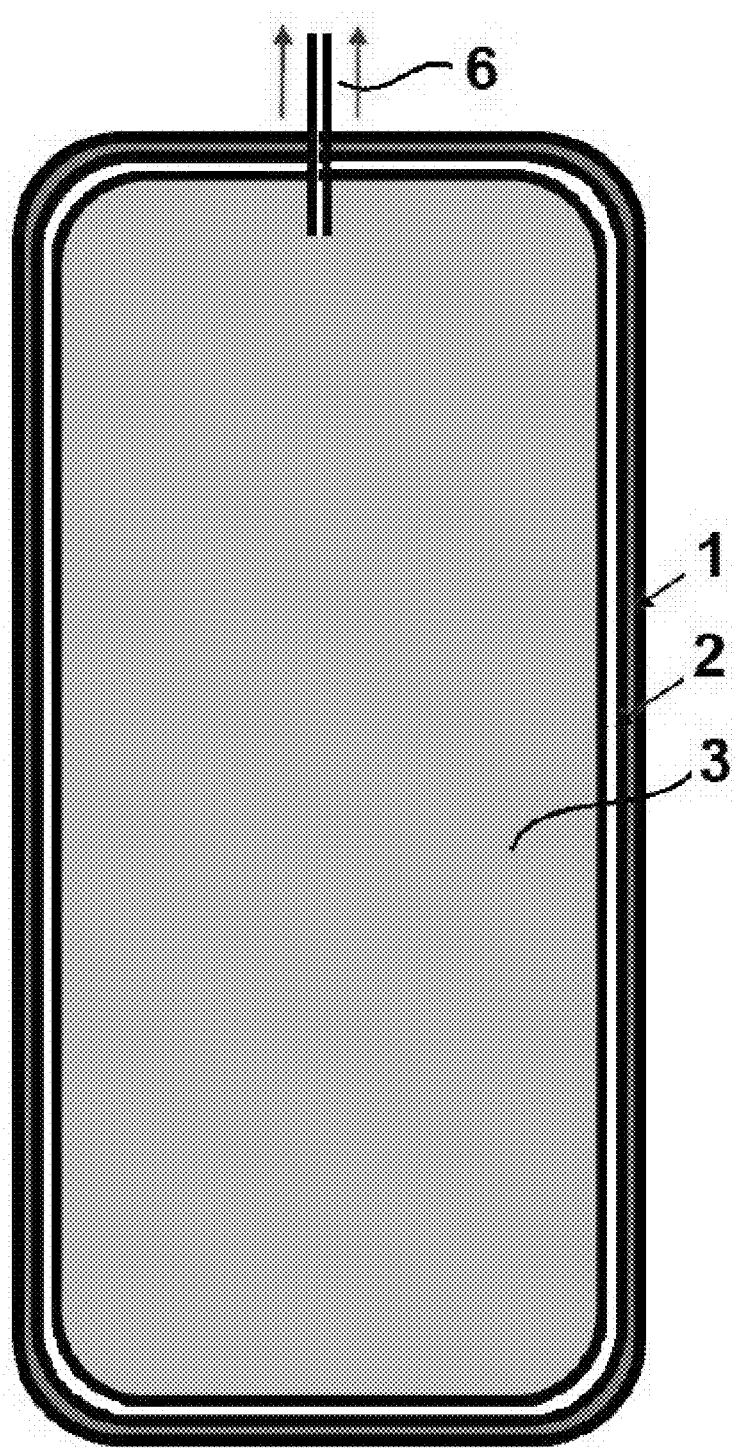
FIG. 5 shows an elevational cross-sectional view of an exemplary storage tank having three rounded cylindrical shells.
Figure 6:
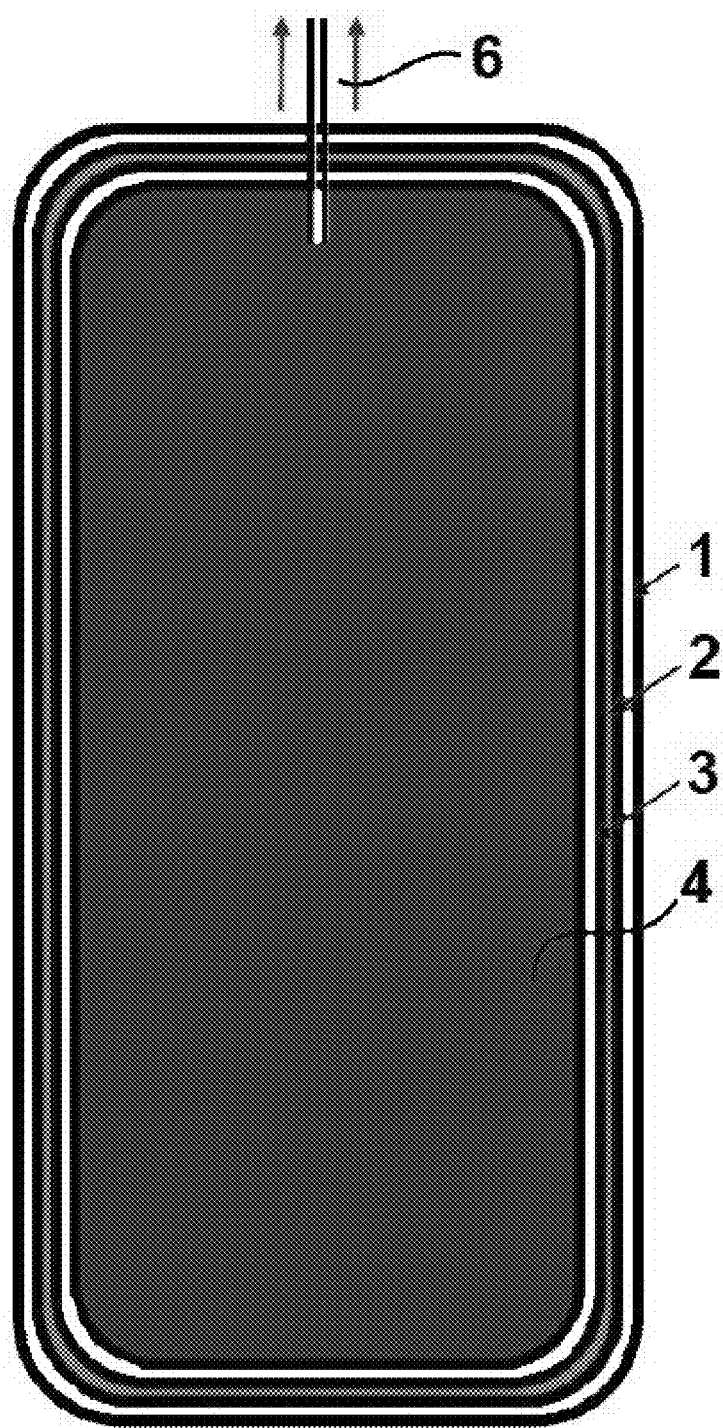
FIG. 6 shows an elevational cross-sectional view of an exemplary storage tank having four rounded cylindrical shells.

FIGS. 4 to 6 illustrate exemplary storage tanks including two, three, and four rounded cylindrical shells (1, 2, 3, 4) and an inlet/outlet valve (6), allowing for mass maximization according to the exemplary protocol illustrated in FIG. 2A and described herein. Additional shells are, of course, possible within the scope of the invention.

Figure 7:
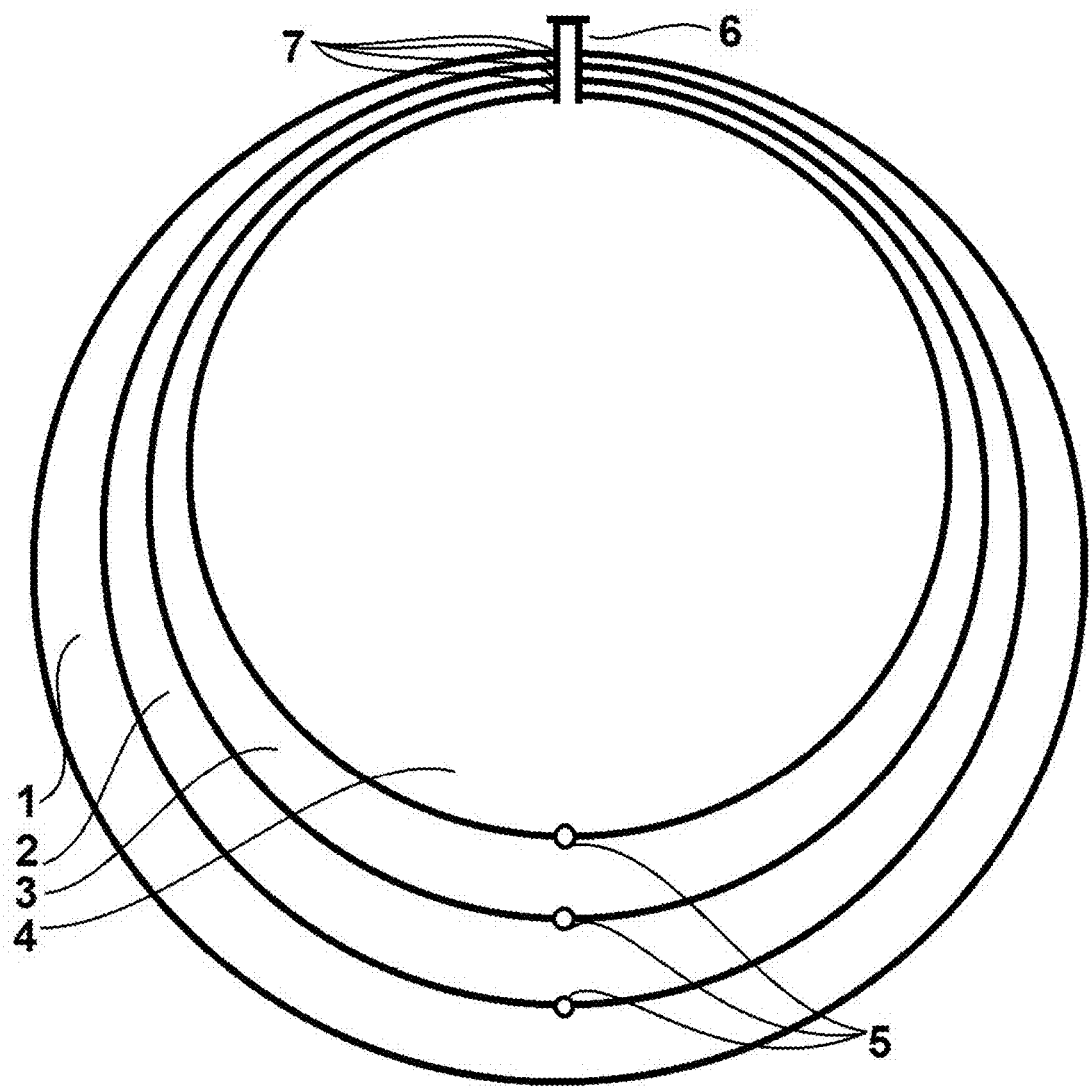
FIG. 7 shows an elevational cross-sectional view of an exemplary storage tank having four spherical shells, which are "axially" centered but not concentric.

FIG. 7 is provided to describe how an exemplary storage tank including four spherical shells (1, 2, 3, 4) or more, which are "axially" centered but not concentric, may be formed, including safety/control valves (5) and a welded (7) inlet/outlet valve (6) without detail, as these elements may be according to any standard equipment used in the art. The control/safety valves (5) herein must not align linearly, and instead may alternately be placed as desired in the shells with respect to each other.

An advantage of the inventive tanks describes herein is that they may only require a single inlet/outlet pipe or valve (6). Moreover, inventive tanks do not require, and preferably eschew, heavier and/or thicker outermost shells or plates. The inventive design and method described herein can take advantage of the "pressure" shells intervening between the inner and outer shell, in order to create pressure differentials to allow the internal walls to withstand higher pressures (absolute) than they would without shells, relying on a gauge-type pressure layering. The amount of gas stored may be in a range of 2 to 3 times known tanks with similar outer structure size, corresponding to a possible mass increase of approx. 175%.

Exemplary pressure differentials for the multi-walled storage tank as described herein are tabulated below as mere examples of possible arrangements X to n·X, wherein the pressure in question may be 80 MPa (or 60 MPa, or 100 MPa, or 125 MPa, or 150 MPa, etc.), illustrating out the pressure differential, i.e., the pressure on the wall separating one shell from another, may be used in methods or tanks according to the invention.

TABLE 1

Exemplary Pressures/(Max) Differentials

| shell | P | ΔP | P | ΔP | P | ΔP | P | ΔP | P = 80 | | | | | | ΔP |
|---|---|---|---|---|---|---|---|---|---|---|---|---|---|---|---|
| 1 (outer) | X | X | 80 | 80 | 100 | 100 | 125 | 125 | 80 | 80 | 80 | 80 | 80 | 80 | 80 |
| 2 | 2X | | 160 | | 200 | | 250 | | | 160 | 160 | 0 | 160 | 160 | 0 |
| 3 | 3X | | 240 | | 300 | | 375 | | | 240 | 80 | 80 | 240 | 80 | 80 |
| 4 | 4X | | 320 | | 400 | | 500 | | | 160 | 160 | 160 | 160 | 0 | 160 |
| ... | ... | | ... | | ... | | ... | | | | | | | | |
| n (inner) | nX | | n · 80 | | n · 100 | | n · 125 | | | | | | | | |

The differentials in the table will normally correspond to a maximum tolerance or strength of the shell wall, taking into consideration regulatory and safety guidelines as well as wall material properties. The different pressures exemplified for 80 MPa on the right do not correspond to the optimized mass confinement described herein, but merely illustrate the pressure differential principle.

Obviously, numerous modifications and variations of the present invention are possible in light of the above teachings. It is therefore to be understood that within the scope of the appended claims, the invention may be practiced otherwise than as specifically described herein.

REFERENCE SIGNS 1 first shell volume
1b first shell/wall
2 second shell volume
2b second shell/wall
3 third shell volume
3b third shell/wall
4 fourth shell volume
4b fourth shell/wall
5 pressure control/relief valve(s)
6 inlet/outlet
7 weld or seal
8 pressure control unit(s)/system
9 gas output
$D_1$ first diameter
$D_2$ second diameter
$D_3$ third diameter
$D_4$ fourth diameter

The invention claimed is:

1. A storage tank, comprising:
a first vessel, including a first wall and a first internal cavity;
a second vessel, including a second wall and a second internal cavity, the second vessel being secured inside the first internal cavity;
a third vessel, including a third wall and a third internal cavity, the third vessel being secured inside the second internal cavity,
wherein the first vessel is configured to contain a first fluid with a first pressure of up to X,
wherein the second vessel is configured to contain a second fluid with a second pressure of up to 2X,
wherein the third vessel is configured to contain a third fluid with a third pressure of up to 3X,
wherein the walls of the vessels comprise substantially the same material,
wherein the third wall has a thickness which is greater than a thickness of the second wall and the second wall has a thickness which is greater than a thickness of the first wall,
wherein each pair of adjacent vessels has a vessel diameter ratio of 1:0.975 to 1:0.925,
wherein the vessels each have a spherical geometry,
wherein the storage tank has a single inlet/outlet pipe passing through the first, second, and third walls, and
wherein each vessel is affixed only by the single inlet/outlet pipe.

2. The storage tank of claim 1, configured such that a volume of an innermost vessel is 65% to 85% relative to the volume of the first vessel.

3. The tank of claim 1, wherein the vessels are concentric.

4. The tank of claim 1, configured such that at least one of the fluids comprises a different substance.

5. The tank of claim 1, wherein the walls of the vessels have a variance of no more than 5% in thickness.

6. The tank of claim 1, wherein the material of the walls is the same and comprises a metal.

7. An article, comprising:
the tank of claim 1; and
a substance, which is gaseous at standard temperature and pressure, as the fluids.

8. The tank of claim 1, further comprising a high surface area material having a BET surface area in a range of 500 to 7,500 $m^2$/g disposed within each internal cavity.

9. The tank of claim 1, wherein the inlet/outlet pipe permits fluid passage only into an innermost vessel.

* * * * *